(12) United States Patent
Ausserlechner (10) Patent No.: US 10,928,221 B2
(45) Date of Patent: Feb. 23, 2021

(54) MAGNETIC SENSOR ARRANGEMENT AND MAGNETIC SENSING METHOD

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 125 days.

(21) Appl. No.: 15/899,446

(22) Filed: Feb. 20, 2018

(65) Prior Publication Data

US 2018/0245947 A1    Aug. 30, 2018

(30) Foreign Application Priority Data

Feb. 24, 2017   (DE) ..................... 10 2017 103 877.9

(51) Int. Cl.
*G01D 5/14* (2006.01)
*G01B 7/30* (2006.01)
*G01D 5/04* (2006.01)

(52) U.S. Cl.
CPC .............. *G01D 5/145* (2013.01); *G01B 7/30* (2013.01); *G01D 5/04* (2013.01)

(58) Field of Classification Search
None
See application file for complete search history.

(56) References Cited

U.S. PATENT DOCUMENTS

| | | | |
|---|---|---|---|
| 5,930,905 A | 8/1999 | Zabler et al. | |
| 6,288,533 B1* | 9/2001 | Haeberli | A61K 48/00 324/207.12 |
| 2007/0090830 A1 | 4/2007 | Shiraga et al. | |
| 2009/0013821 A1* | 1/2009 | Koma | B62D 15/0215 74/575 |
| 2010/0060272 A1 | 3/2010 | Tanaka et al. | |
| 2014/0043019 A1 | 2/2014 | Braun et al. | |
| 2016/0265940 A1* | 9/2016 | Burgdorf | B60T 8/171 |
| 2017/0001304 A1* | 1/2017 | Kato | B25J 9/102 |

FOREIGN PATENT DOCUMENTS

| | | |
|---|---|---|
| CN | 101147044 A | 3/2008 |
| CN | 102032862 A | 4/2011 |
| CN | 103154687 A | 6/2013 |
| CN | 105765348 A | 7/2016 |
| CN | 105899333 A | 8/2016 |
| DE | 19506938 | 8/1996 |
| DE | 10002331 | 8/2001 |
| DE | 102010063845 | 6/2012 |
| DE | 102014200365 | 5/2015 |
| DE | 112015000591 | 11/2016 |
| JP | 2009145076 | 7/2009 |

* cited by examiner

*Primary Examiner* — Douglas X Rodriguez
(74) *Attorney, Agent, or Firm* — Harrity & Harrity, LLP (57) ABSTRACT

The present disclosure relates to a magnetic sensor arrangement comprising a first rotatable body having a first magnetic quadrupole attached thereto, a first magnetic sensor configured to generate, in response to a rotational angular position of the first magnetic quadrupole, a first sensor signal indicative of a first rotational angle of the first rotatable body, a second rotatable body having a second magnetic quadrupole attached thereto, and a second magnetic sensor configured to generate, in response to a rotational angular position of the second magnetic quadrupole, a second sensor signal indicative of a second rotational angle of the second rotatable body.

20 Claims, 6 Drawing Sheets

MAGNETIC SENSOR ARRANGEMENT AND MAGNETIC SENSING METHOD

RELATED APPLICATION

This application claims priority under 35 U.S.C. § 119 to German Patent Application No. 102017103877.9, filed on Feb. 24, 2017, the contents of which are incorporated by reference herein in their entirety.

TECHNICAL FIELD

The present disclosure generally relates to methods and apparatuses for sensing angles of rotatable bodies and, more particularly, to methods and apparatuses for sensing angles of more than 360°.

BACKGROUND

Magnetic sensors, such as Hall sensors or magnetoresistive sensors, are used in many modern day angular position sensing systems to detect the angular position of a rotating object, such as a shaft, a pole wheel, or a gear wheel. Such angular position sensors have applications in many fields such as automotive, industrial, etc. For example, in automobiles angular position sensors are used in brushless direct current (BLDC) motors to detect rotor position during operation or in steering angle measurement to provide information about the direction a driver wants to go for automatic steering applications (e.g., electric power steering, electronic stability control, active steering systems, parking assistance systems, etc.).

If two or more magnetic sensors are used to detect magnetic fields generated by two or more separate magnets, magnetic crosstalk or interference between the different magnets can occur, in particular when the magnets and/or sensors are located in close proximity. This can lead to the unfavorable situation where a first magnetic sensor which is associated with a first magnet does not only measure the magnetic field caused by said first magnet, but also measures a magnetic field components caused by a (nearby) second magnet. Likewise, a second magnetic sensor which is associated with the second magnet does not only measure the magnetic field caused by the second magnet, but also measures magnetic field components caused by the (nearby) first magnet. This crosstalk can lead to impaired angle measurements.

SUMMARY

According to an aspect of the present disclosure, it is provided a magnetic sensor arrangement. The magnetic sensor arrangement comprises a first rotatable body with a first magnetic quadrupole. A first magnetic sensor is configured to generate, in response to a rotational angular position of the first magnetic quadrupole, a first sensor signal indicative of a first rotational angle of the first rotatable body. The magnetic sensor arrangement comprises a second rotatable body with a second magnetic quadrupole. A second magnetic sensor is configured to generate, in response to a rotational angular position of the second magnetic quadrupole, a second sensor signal indicative of a second rotational angle of the second rotatable body.

The use of magnetic quadrupoles or quadrupole magnets allows for reduced crosstalk between the respective magnetic fields. Thus, the first magnetic sensor may experience less magnetic interference from the second magnetic quadrupole and likewise the second magnetic sensor may experience less magnetic interference from the first magnetic quadrupole. The quality of the angle measurements can thus be increased.

In some example implementations, a first rotational axis of the first rotatable body can be parallel to a second rotational axis of the second rotatable body. This can include configurations with collinear rotational axes as well as with mutually spaced rotational axes.

In some example implementations, the first magnetic sensor can be positioned relatively to the first magnetic quadrupole along a first rotational axis of the first rotatable body. Likewise, the second magnetic sensor can be positioned relatively to the second magnetic quadrupole along a second rotational axis of the second rotatable body.

In some example implementations, a sensing surface of the first magnetic sensor can face the first magnetic quadrupole. Likewise, a sensing surface of the second magnetic sensor can face the second magnetic quadrupole. Thereby, a sensing surface can be the surface of a Hall plate or the surface of a sensing layer of a magnetoresistor, for example.

In some example implementations, a distance between the first and the second magnetic quadrupoles can be less than 30 mm, less than 20 mm, or even less than 10 mm. The distance can be measured with respect to the respective centers of gravity, for example. Thus, the first and the second magnetic quadrupoles can be positioned close to each other.

In some example implementations, a respective magnetic quadrupole can comprise a first magnetic dipole portion and an adjacent and oppositely oriented second magnetic dipole portion, wherein the respective magnetic North and South poles of the first and the second dipole portions are separated in a direction parallel to a rotational axis of the respective rotatable body. Thus, an orientation of a magnetization vector within the respective magnetic quadrupole can run essentially parallel or antiparallel to the rotational axis of the respective rotatable body. This can also be referred to as axial magnetic quadrupoles.

In some example implementations, the respective magnetic quadrupole can be combined with a third magnetic dipole portion, wherein the magnetic poles of the third dipole portion are separated in a direction perpendicular to the rotational axis of the respective rotatable body. Such implementations lead to a combination of magnetic quadrupoles and magnetic dipoles within one magnet.

In some example implementations, the first magnetic quadrupole and the second magnetic quadrupole can be configured to generate respective magnetic fields of substantially equal strengths, leading to a balanced setup.

In some example implementations, the first magnetic quadrupole can be arranged in a first soft-magnetic shielding sleeve or cup and the second magnetic quadrupole can be arranged in a second soft-magnetic shielding sleeve or cup. The shielding(s) can be ferrous shielding(s). Thereby "ferrous" indicates the presence of iron. Thus, in some examples, a shielding sleeve or cup could can be made of steel or other alloys comprising iron.

In some example implementations, a bottom of a respective soft-magnetic shielding sleeve or cup can be attached to a respective end face of a respective rotatable body and a top opening of the respective soft-magnetic shielding sleeve or cup can face a respective magnetic sensor.

In some example implementations, the first and the second rotatable bodies can be rotationally symmetric bodies, respectively. Additionally or alternatively, the first and the second magnetic quadrupoles can be rotationally symmetric.

In some example implementations, the first rotatable body can be rotatably coupled to the second rotatable body, for example, via one or more gear wheels.

In some example implementations, the first rotatable body can be a shaft (for example, a camshaft, crankshaft, or a shaft of a steering wheel) and the second rotatable body can also be a shaft or a gear wheel.

In some example implementations, the magnetic sensor arrangement can further optionally comprise processing circuitry configured to compute a total rotational angle larger than 360° of one of the first and second rotatable bodies or a third rotatable body engaging with at least one of the first and second rotatable bodies based on the first and the second sensor signals. Here, a Vernier or Nonius principle can be used.

According to a further aspect of the present disclosure, it is provided a magnetic sensor arrangement which comprises a rotatably mounted shaft comprising a first face and a first magnetic quadrupole attached to the first face. A first magnetic sensor is configured to generate, in response to a magnetic field of the first magnetic quadrupole, a first sensor signal indicative of a first rotational angle of the shaft. The magnetic sensor arrangement comprises a rotatably mounted object which is rotatably coupled to the shaft and which comprises a second face and a second magnetic quadrupole attached to the second face. A distance between the first and the second faces is less than 30 mm. A second magnetic sensor is configured to generate, in response to a magnetic field of the second magnetic quadrupole, a second sensor signal indicative of a second rotational angle of the rotatably mounted object. A processor is configured to compute a total rotational angle of the shaft larger than 360° based on the first and the second sensor signals using a Vernier or Nonius principle.

In some example implementations, the first magnetic quadrupole can comprise a respective first magnetic dipole portion and an adjacent and oppositely oriented respective second magnetic dipole portion. Magnetic poles of the first magnetic quadrupole's first and second dipole portions can be spaced apart in a direction parallel to a rotational axis of the shaft. Likewise, the second magnetic quadrupole can comprise a respective first magnetic dipole portion and an adjacent and oppositely oriented respective second magnetic dipole portion. Magnetic poles of the second magnetic quadrupole's first and second dipole portions can be spaced apart in a direction parallel to a rotational axis of the rotatably mounted object.

In some example implementations, a sensing surface of the first magnetic sensor can face a top surface of the first magnetic quadrupole, and a sensing surface of the second magnetic sensor can face a top surface of the second magnetic quadrupole.

According to yet a further aspect of the present disclosure, it is provided a magnetic sensing method. The method includes generating, in response to a sensed magnetic field of a first magnetic quadrupole attached to a first surface of a first rotatable body, a first sensor signal indicative of a first rotational angle of the first rotatable body, and generating, in response to a sensed magnetic field of a second magnetic quadrupole attached to a second surface of a second rotatable body, a second sensor signal indicative of a second rotational angle of the second rotatable body. A total rotational angle larger than 360° of one of the first and second rotatable bodies can be computed based on the first and the second sensor signals.

BRIEF DESCRIPTION OF THE DRAWINGS

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
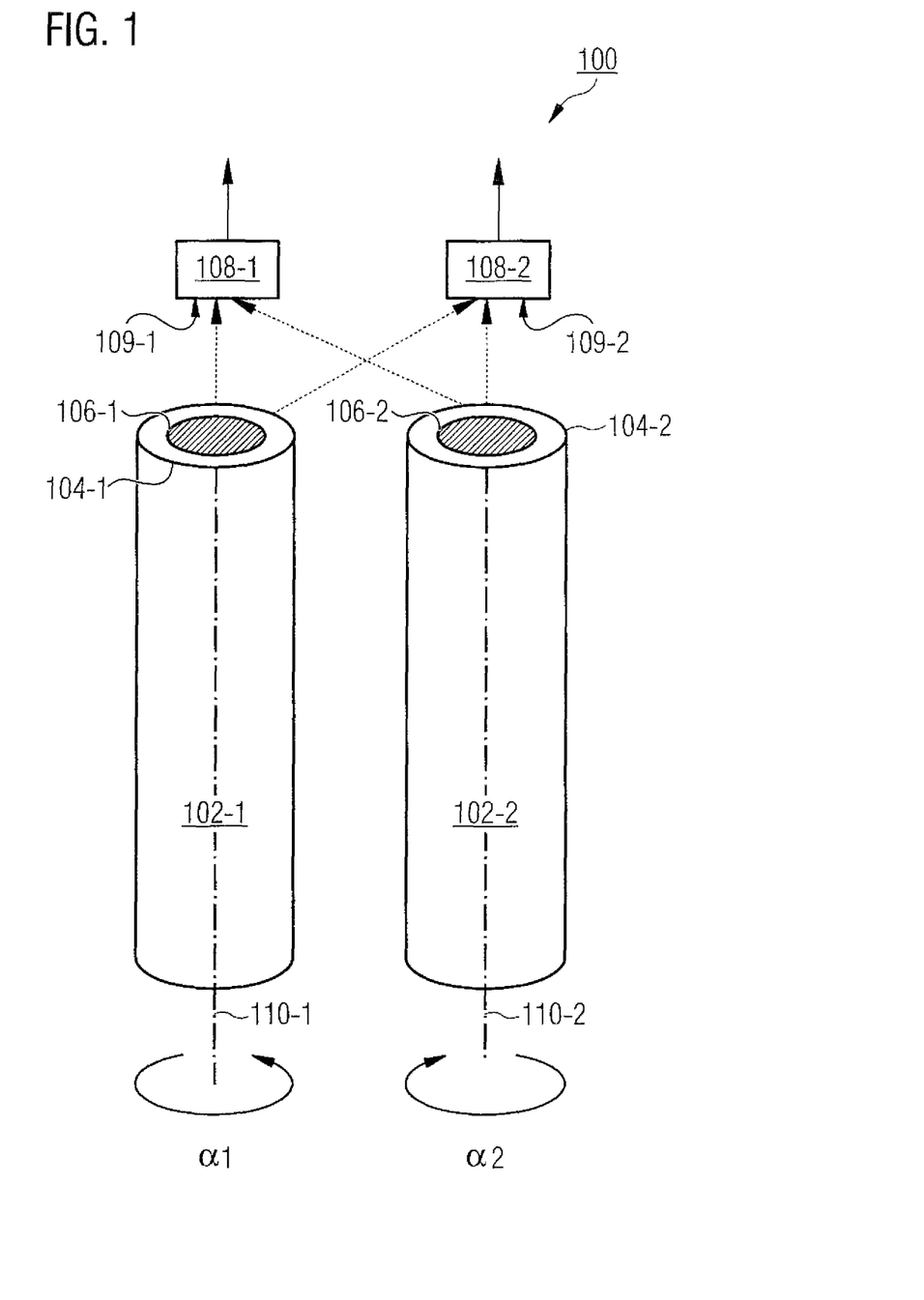
FIG. 1 shows a schematic view of a magnetic sensor arrangement according to an example of the present disclosure.

FIG. 1 shows a schematic view of a magnetic sensor arrangement 100 according to an example of the present disclosure.

The magnetic sensor arrangement 100 comprises a first rotatable body 102-1 which comprises a first surface 104-1. A first magnetic quadrupole 106-1 is mounted to the first surface 104-1. The magnetic sensor arrangement 100 comprises a first magnetic sensor 108-1 which is associated with the first magnetic quadrupole 106-1 and which is configured to generate, in response to a rotational angular position of the first magnetic quadrupole 106-1, a first sensor signal indicative of a first rotational angle $\alpha_1$ of the first rotatable body 102-1. The rotational angle or angle of rotation $\alpha_1$ is a measurement of the angle by which the first rotatable body 102-1 and/or the first magnetic quadrupole 106-1 is rotated about a respective rotational axis 110-1 of the first rotatable body 102-1. The first sensor signal may uniquely indicate the first rotational angle $\alpha_1$.

The magnetic sensor arrangement 100 also comprises at least one second rotatable body 102-2 having a second surface 104-2. A second magnetic quadrupole 106-2 is attached to the second surface 104-2. The magnetic sensor arrangement 100 comprises at least one second magnetic sensor 108-2 which is associated with the second magnetic quadrupole 106-2 and which is configured to generate, in response to a rotational angular position of the second magnetic quadrupole 106-2, a second sensor signal indicative of a second rotational angle $\alpha_2$ of the second rotatable body 102-2. The rotational angle or angle of rotation $\alpha_2$ is a measurement of the angle by which the second rotatable body 102-2 and/or the second magnetic quadrupole 106-2 is rotated about a respective rotational axis 110-2 of the second rotatable body 102-2. The second sensor signal may uniquely indicate the second rotational angle $\alpha_2$.

In general the rotatable bodies 102-1, 102-2 can be rotated in the same direction, in different directions, synchronously, or asynchronously. A rotation of the second rotatable body 102-2 may be independent of a rotation of the first rotatable body 102-1 (or vice versa), or they may rotate dependent on each other. In the latter case, a gear transmission ratio between the rotatable bodies 102-1, 102-2 can be fixed or variable.

A first magnetic field caused by first magnetic quadrupole 106-1 at a position of the first magnetic sensor 108-1 may be substantially larger (for example, at least twice as large) than a second magnetic field caused by second magnetic quadrupole 106-2 at the position of the first magnetic sensor 108-1. Likewise, the second magnetic field caused by second magnetic quadrupole 106-2 at a position of the second magnetic sensor 108-2 may be substantially larger (for example, at least twice as large) than the first magnetic field caused by first magnetic quadrupole 106-1 at the position of the second magnetic sensor 108-2.

Although the first and second surfaces 104-1 and 104-2 in the illustrated example are flat surfaces perpendicular to the respective rotational axes 110-1, 110-2, the skilled person having benefit from the present disclosure will appreciate that the magnetic quadrupoles 106-1, 106-2 can also be mounted to curved surfaces or flat surfaces arranged in other angles with respect to the rotational axes 110-1, 110-2 in other example implementations.

Examples of the present disclosure can be particularly useful for arrangements, where the quadrupole magnets 106-1, 106-2 and/or the magnetic sensors 108-1, 108-2 are in close proximity to each other, since a crosstalk between the magnetic fields of the quadrupole magnets 106-1, 106-2 may be considerably smaller than a crosstalk between the magnetic fields of conventional dipole magnets. In some examples, a distance between the first and the second magnetic quadrupoles 106-1, 106-2 and/or the sensors 108-1, 108-2 may be less than 30 mm, less than 20 mm, or even less than 10 mm. In the illustrated example, the distance may correspond to a distance between the two rotational axes 110-1, 110-2 of the rotatable bodies. Compared to conventional solutions, sensor 108-1, which is associated with quadrupole magnet 106-1 may experience less magnetic interference from quadrupole magnet 106-2. Likewise, sensor 108-2, which is associated with quadrupole magnet 106-2, may experience less magnetic interference from quadrupole magnet 106-1. This is due to the shape of a magnetic field generated by a quadrupole magnet, which does not reach as far as in the case of a dipole magnet.

Figure 2A:
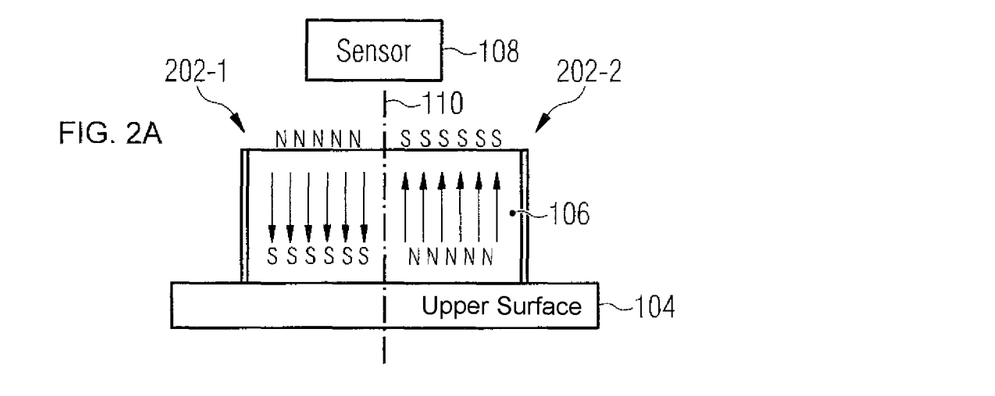
FIGS. 2A-2C show cross-sectional views of several example magnetic quadrupole configurations.
Figure 2B:
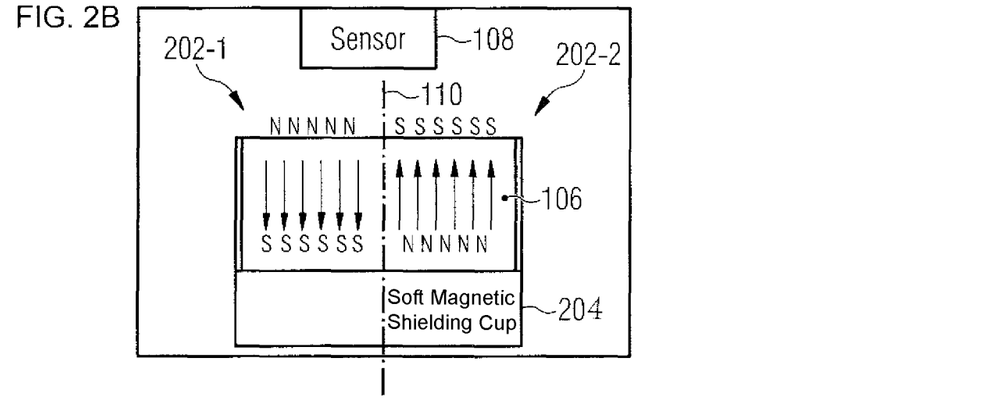
Figure 2C:
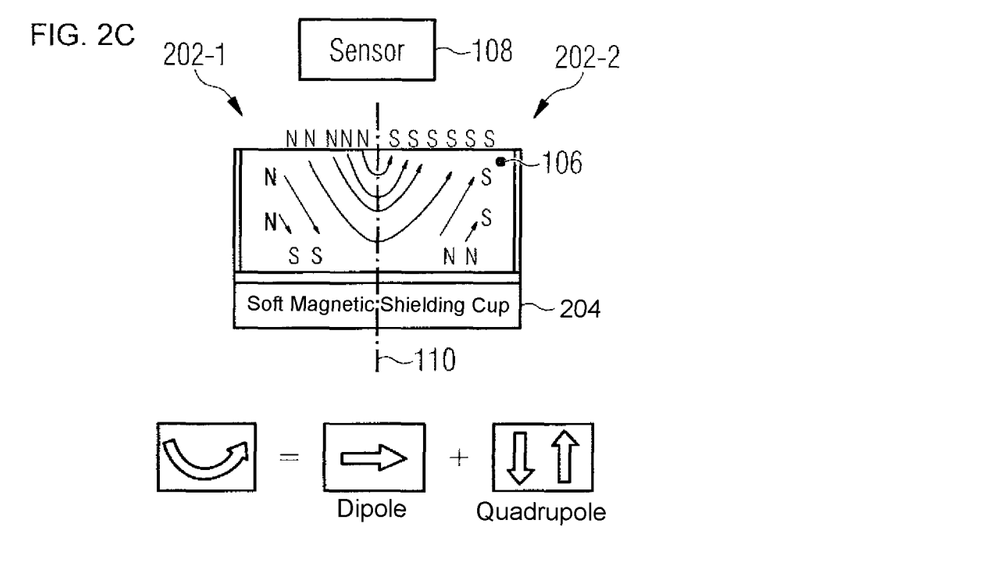

FIGS. 2A-2C illustrate some cross sectional views of example quadrupole magnets 106 placed vis-à-vis magnetic sensors 108.

Figure 3A:
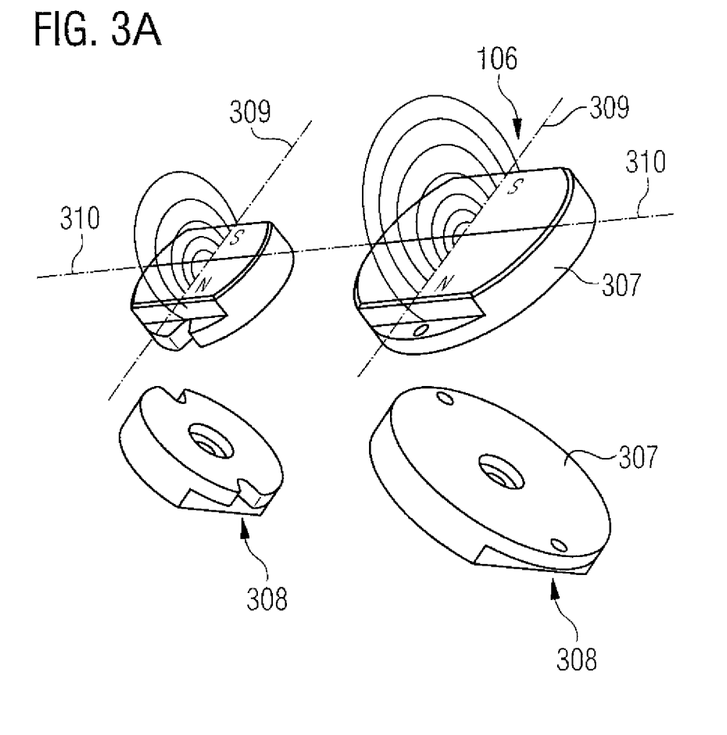
FIGS. 3A and 3B show perspective views of example magnetic quadrupole configurations.

FIG. 2A shows a first example of a quadrupole magnet 106 which is fixed to an upper surface 104 of a rotatable body. The quadrupole magnet 106 is placed below magnetic sensor 108 and comprises a first magnetic dipole portion 202-1 (left) and an adjacent and oppositely oriented second magnetic dipole portion 202-2 (right). The first and second dipole portions 202-1, 202-2 can be formed integrally or separately. In the illustrated example, the respective magnetic poles N and S of the first and the second dipole portions 202-1, 202-2 are separated or spaced apart in a direction parallel to the rotational axis 110 of the rotatable body, leading to an axial orientation of the magnetization vectors inside the quadrupole magnet 106. The magnetization vectors in the (permanent) quadrupole magnet 106 are essentially parallel and antiparallel to the rotational axis 110. In the example of FIG. 2A, the upper left portion of quadrupole magnet comprises a magnetic North pole (N), while the lower left part comprises a magnetic South pole (S). Oppositely, the upper right portion of quadrupole magnet 106 comprises a magnetic South pole (N), while the lower right portion comprises a magnetic North pole (N). Thus, the magnetic dipole moment of this example configuration is essentially zero. The adjacent N- and S-poles on the top of quadrupole magnet 106 can lead to a magnetic field which does not reach as far into the space as in the case of a dipole magnet. Said differently, a slope of the quadrupole field versus distance from the magnet is of higher order than a slope of a dipole magnet. A perspective view of the quadrupole magnet 106 shown in FIG. 2A together with a corresponding fixture 307 is depicted in FIG. 3A. The fixture 307 also comprises attachment means 308 like peripheral holes or ears to fix the magnet 106 to a rotatable body. In FIG. 3A these attachment means 308 are located symmetrically to the N-S-pole pattern in such a way that they lie on a line 309, which is perpendicular to a borderline 310 between N-poles and S-poles. Symmetrical placement of attachment means preserves the symmetry of the magnetic poles and therefore also the symmetry of the magnetic field, which yields more accurate determination of the angle of the rotatable body, particularly in the presence of manufacturing tolerances.

Attachment means of quadrupole magnets may also be rotationally symmetric, e.g. a central hole. Then the magnets take on the shape of rings. The magnetization patterns of such rings is identical to the magnetization patterns of the magnets shown in FIGS. 2A-2C, 3A, and 3B, with the exception that a hole can be placed in the magnet and this hole can extend through the magnet along the rotation axis.

FIG. 2B shows another example, which differs from FIG. 2A in that quadrupole magnet 106 is arranged in a soft-magnetic shielding cup 204, which can be made of steel or another alloy comprising iron or another soft-magnetic material with large relative permeability $\mu_r$>50. The soft-magnetic shielding cup 204 can have a relative permeability of $\mu_r$>500 or even $\mu_r$>800, for example. The bottom of the soft-magnetic shielding cup 204 can be attached to the upper surface 104 of the respective rotatable body 102. A top opening of the soft-magnetic shielding cup 204 can face the magnetic sensor 108. In this way, the soft-magnetic shielding cup 204 can substantially magnetically isolate the quadrupole magnet 106 from its surrounding to the left, the right and the bottom. Thus, there only will be a significant magnetic field closely above the quadrupole magnet 106. Thus, if both quadrupole magnets 106-1, 106-2 are arranged in respective soft-magnetic shielding cups mutual magnetic crosstalk can even be further suppressed. The skilled person having benefit from the present disclosure will appreciate that the soft-magnetic shielding cup 204 could also be replaced by a soft-magnetic shielding ring or sleeve, in particular when the upper surface 104 of rotatable body 102 is also soft-magnetic. Moreover the soft magnetic shielding cup can be an integral part of a soft magnetic shaft as it is shown in FIG. 1, where the magnet resides in a stud-hole drilled into the end face of the shaft. Thereby, the top surface of the magnet can be flush with the top of the shielding cup or the ring part of the shielding cup can be a bit longer in axial direction than the axial thickness of the magnet so that the magnet is protected by the shielding cup from collision with other parts.

FIG. 2C shows another example, which differs from FIG. 2B in that quadrupole magnet 106 is combined with a further magnetic dipole portion. The magnetic poles (S, N) of the further dipole portion are separated in a direction perpendicular to the rotational axis 110 of the respective rotatable body. That is, there is an additional horizontally or diametrically oriented magnetic dipole in the example of FIG. 2C. The magnetic dipole moment of this example configuration is different from zero. Examples of the present disclosure can thus also comprise a hybrid between an axial quadrupole and horizontal (or radial) dipole magnet. The skilled person having benefit from the present disclosure will appreciate that the soft-magnetic shielding cup 204 in FIG. 2C is optional. However, it can positively cancel or at least reduce magnetic field components stemming from the magnetic dipole portion such that the external magnetic field is dominated by the magnetic quadrupole portion.

Figure 3B:
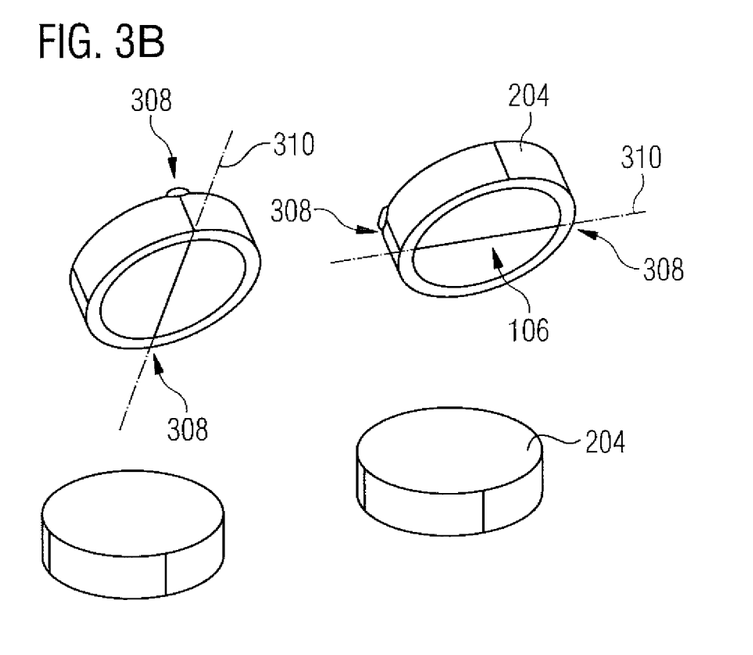

A perspective view of the quadrupole magnet 106 shown in FIG. 2B or FIG. 2C together with corresponding ferrous shielding cup 204 is depicted in FIG. 3B. In FIG. 3B also indicates locations of attachment means 308. Like in FIG. 3A, they are located symmetrically to the N-S-pole pattern, but in contrast to FIG. 3A, they lie on line 310, which is identical to the border line between N- and S-poles. This placement of attachment means can have the advantage of cutting off magnetic N-S-poles, which are more closely spaced than in FIG. 3A and therefore they do not affect the magnetic field so much as in FIG. 3A.

In some applications the magnet does not need to have peripheral attachment means like holes or ears, e.g. because it can be glued onto the shaft—however, it might still be necessary to provide some asymmetric feature on the outer diameter to mark the direction of the magnetic field. Such an alignment mark may also affect the magnetic pole size and the magnetic field similarly to attachment means. Therefore, these alignment marks may also be placed at the locations where the attachment means are in FIGS. 3A and 3B.

Generally, a good mutual or symmetric interference suppression may be achieved if the first magnetic quadrupole 106-1 and the second magnetic quadrupole 106-2 are configured to generate or cause respective magnetic fields of substantially equal strength. Otherwise, a slightly asymmetric magnetic interference suppression may be the result.

Turning back to FIG. 1, the first rotatable body 102-1 and the second rotatable body 102-2 are both depicted as rotationally symmetric cylindrical shafts. The skilled person having benefit from the present disclosure will appreciate, however, that the rotatable bodies 102 can be of arbitrary shape. They do not even have to be rotationally symmetric, as it would be the case for camshafts or crankshafts for example. Also, the first rotatable body 102-1 can be of a different type than the second rotatable body 102-2. For example, one of the rotatable bodies can be a shaft, while the other can be a gear wheel. Both rotatable bodies can be gear wheels. Countless different configurations are possible.

In the illustrated example of FIG. 1, the first rotational axis 110-1 of the first rotatable body 102-1 is parallel to the second rotational axis 110-2 of the second rotatable body 102-2. Also this is only an example configuration. In other example configurations, for example related to gimbals, both rotational axes do not need to be parallel. They could extend in an arbitrary angle with respect to each other, such as 45° or 90°, just to name two examples. However, in many applications where the principles of the present disclosure can be used, the rotational axes will run in parallel.

In the illustrated example of FIG. 1, the first magnetic sensor 108-1 is positioned relatively to the first magnetic quadrupole 106-1 along the first rotational axis 110-1 of the first rotatable body 102-1. Similarly, the second magnetic sensor 108-2 is positioned relatively to the second magnetic quadrupole 106-2 along the second rotational axis 110-2 of the second rotatable body 102-2. Thus, the respective magnetic quadrupole 106 and its associated magnetic sensor 108 can both be positioned on the respective rotational axis 110. For example, the respective magnetic sensor 108 can be positioned above, below, left, or right from its associated magnetic quadrupole 106, depending on the orientation of the rotational axis 110.

In order to obtain possibly precise measurement results, a sensing surface 109-1 of the first magnetic sensor 108-1 can face the first magnetic quadrupole 106-1. Similarly, a sensing surface 109-2 of the second magnetic sensor 108-2 can face the second magnetic quadrupole 106-2. Thereby the term "sensing surface" relates to a surface interacting with an external magnetic field generated by the quadrupole magnets 106. This can be a Hall plate in case of Hall sensor or a magnetic free layer in case of magneto-resistive sensors, such as GMR (Giant-Magneto-Resistance) or TMR (Tunnel-Magneto-Resistance) sensors, for example. The skilled person having benefit from the present disclosure will appreciate, however, that the sensing surface 109 could also face away from the associated magnetic quadrupole 106 in some implementations.

The sensing surfaces 109-1 and 109-2 can be arranged parallel to each other. For example, the magnetic sensors 108-1, 108-2 can be integrated on a common substrate. Thereby the common substrate can be common semiconductor die, a common semiconductor package, or a common component board.

In some example implementations, the magnetic sensors 108-1, 108-2 can be responsive to an angle of a projection of the magnetic field of the respective magnetic quadrupole 106-1, 106-2 onto the respective sensing surfaces 109-1 and 109-2. This is the case, for example, if the magnetic sensors 108-1, 108-2 are implemented as magneto-resistive sensors. The sensing system can be implemented such that an absolute value of the magnetic field's projection onto a sensing surface does not change substantially within a revolution of the rotatable body 102. For example, a maximum value and a minimum value of the magnetic field's projection onto the sensing surface do not differ more than 30% of the maximum or minimum value.

Figure 4:
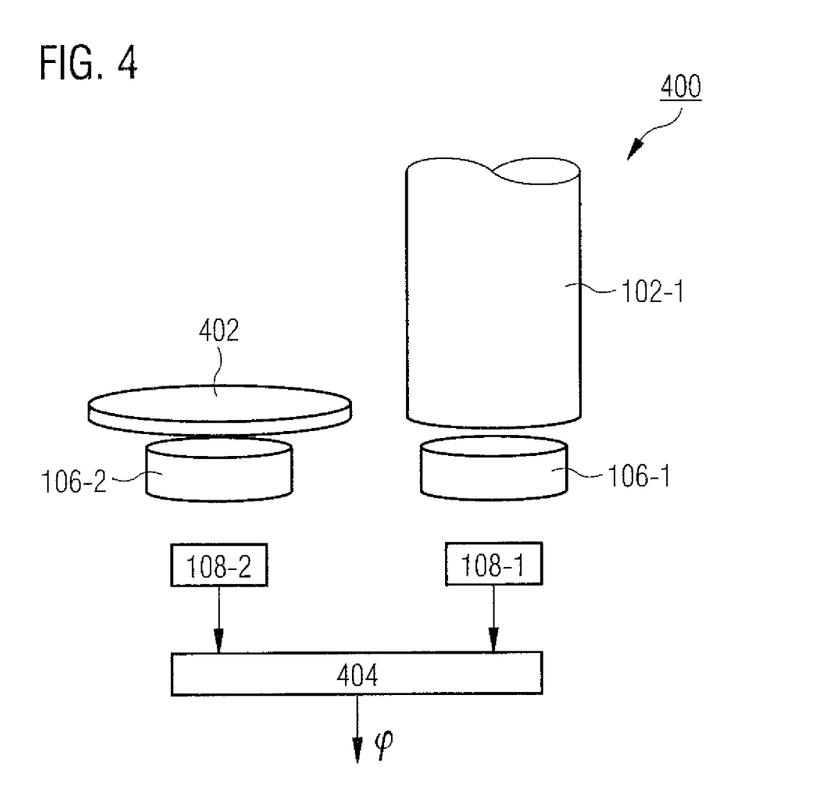
FIG. 4 shows a schematic view of a magnetic sensor arrangement according to a further example of the present disclosure.

In some examples, the first rotatable body 102-1 can be rotatably coupled to the second rotatable body 102-2. FIG. 4 schematically illustrates an example where the first rotatable body 102-1 is implemented as a shaft with a circumferentially extending first tooth wheel (not shown) and a first quadrupole magnet 106-1 mounted to a top surface of the first tooth wheel. For example, the first tooth wheel can be assumed to be arranged concentrically between shaft 102-1 and magnet 106-1. A second rotatable body 102-1 is implemented as a second tooth wheel (not shown) which is geared by the first tooth wheel with a second quadrupole magnet 106-2 mounted to the second tooth wheel. Optionally, an additional soft-magnetic or ferrous shield 402, here in form of a disk, can be placed above the second quadrupole magnet 106-2 as a shield. For example, the second tooth wheel can be assumed to be arranged concentrically between disk 402 and magnet 106-2.

Both tooth wheels can have a slightly different number of teeth, leading to a gear transmission ratio of 20/21, for example. If the shaft 102-1 with the magnet 106-1 makes 21 revolutions, the second tooth wheel 102-2 with magnet 106-2 can make 20 revolutions, for example. The skilled person having benefit from the present disclosure will appreciate that this gear transmission ratio is merely an example and that arbitrary other gear transmission ratios can be implemented. Closely ahead of the magnets 106-1, 106-2 there are magnetic angle sensors 108-1, 108-2 which can detect the rotational angles $\alpha_1$ and $\alpha_2$ of both magnets. Using the Nonius principle of the angles of both magnets, it is possible to uniquely identify $\varphi=21*360°=7650°$ of the angular shaft position. Thus, some example implementations also comprise a processor 404 which is configured to compute a total rotational angle $\varphi$ larger than 360° of one of the first and second rotatable bodies 102-1 or 102-2 based on the first and the second sensor signals or based on the rotational angles $\alpha_1$ and $\alpha_2$. The difference between $\alpha_1$ and $\alpha_2$ can be indicative of $\varphi$. The processor 404 can be implemented by dedicated or general purpose hardware components, such as Digital Signal Processor (DSPs), Field Programmable Gate Arrays (FPGAs) or Application-Specific Integrated Circuits (ASICs), for example.

In the example of FIG. 4, we have only two tooth wheels which can be similar in diameter (because they have nearly equal number of teeth and of course the teeth of them are of identical in size). Therefore the spacing of both magnets 106-1, 106-2 (which are centric with the tooth wheels) is small, if the tooth wheels are small. Therefore, with conventional setups, where the magnetization of each magnet is in a single direction perpendicular to its rotation axis (diametrical dipole magnet), we would have a considerable magnetic cross-talk where the magnetic field on the first magnetic angle sensor is mainly caused by the first magnet, but also a small portion comes from the second magnet. And vice versa the field on the second sensor is not only caused by the second magnet but a small portion comes from the first magnet. Since the magnets are not driven synchronously, the crosstalk would lead to errors in the magnetic angles on each sensor, meaning that the angular position of the magnet is not exactly equal to the angle of the magnetic field detected by the respective angle sensors 108-1, 108-2. This will yield errors in an overall result of a multi-turn angle of the shaft 102-1. However, if both 106-1, 106-2 are implemented as magnetic quadrupoles, such angle errors can be drastically reduced, for example from a conventional range of ±20° to less than ±0.2°.

Figure 5:
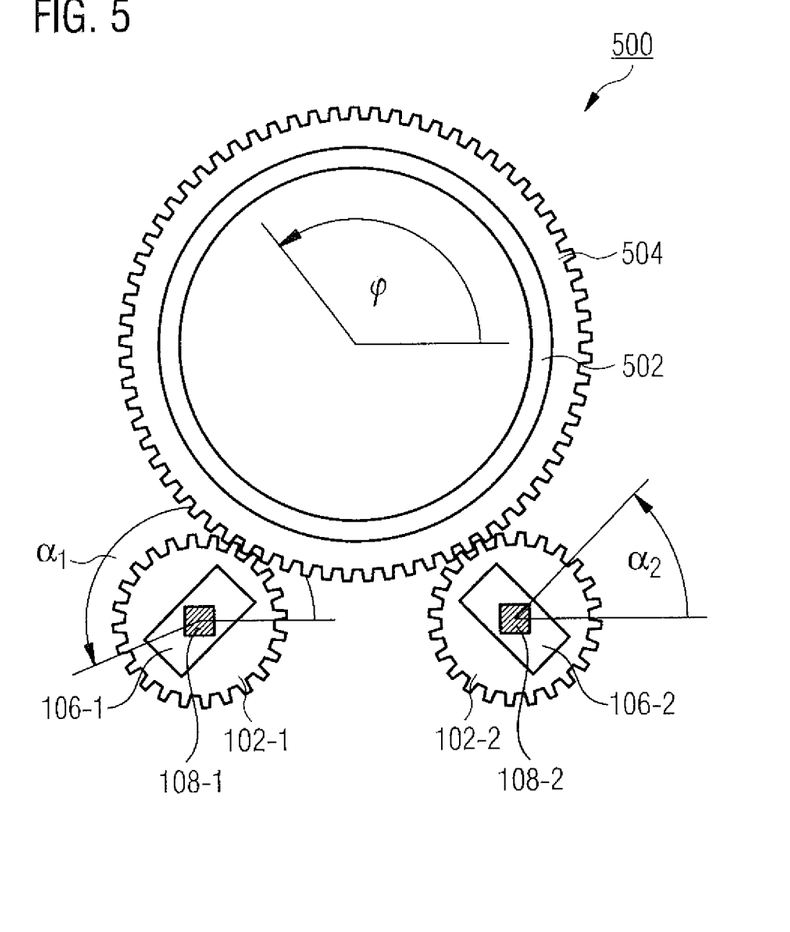
FIG. 5 shows a schematic view of a magnetic sensor arrangement according to yet a further example of the present disclosure.

Another example setup where the principles of the present disclosure can be useful is depicted in FIG. 5.

In FIG. 5, reference numeral 502 identifies a rotatable body (e.g. a shaft), whose total angle of rotation $\varphi$ is to be measured. A gear wheel 504 which has n teeth is attached to the rotatable body 502. Two further rotatable gear wheels 102-1 and 102-2, which can have m and m+1 teeth engage with the gear wheel 504. The rotational angles $\alpha_1$ and $\alpha_2$ of these two gear wheels are measured with the aid of two angle sensors 108-1, 108-2 place above or below quadrupole magnets 106-1 and 106-2. The angle sensors can be connected to an electronic evaluation circuit, in which the calculations required for determining the axle angle $\varphi$ are performed.

Provided that the angle sensors 108-1, 108-2 are so-called absolute sensors, they can provide the angles of rotation $\alpha_1$ and $\alpha_2$ of the gear wheels 102-1 and 102-2 existing at start-up as soon as the device for detecting the angular position of the shaft 502 has been switched on. It may be immediately possible to definitely determine the angle $\varphi$ of the shaft 502, as long as the number of the angular markers or teeth of the gear wheel 504 and the number of the angular markers or teeth of the gear wheels 102-1 and 102-2, is known. The number of the teeth of the individual gear wheels can be selected as a function of how large the angle $\varphi$, which is to be detected, can be.

Figure 6:
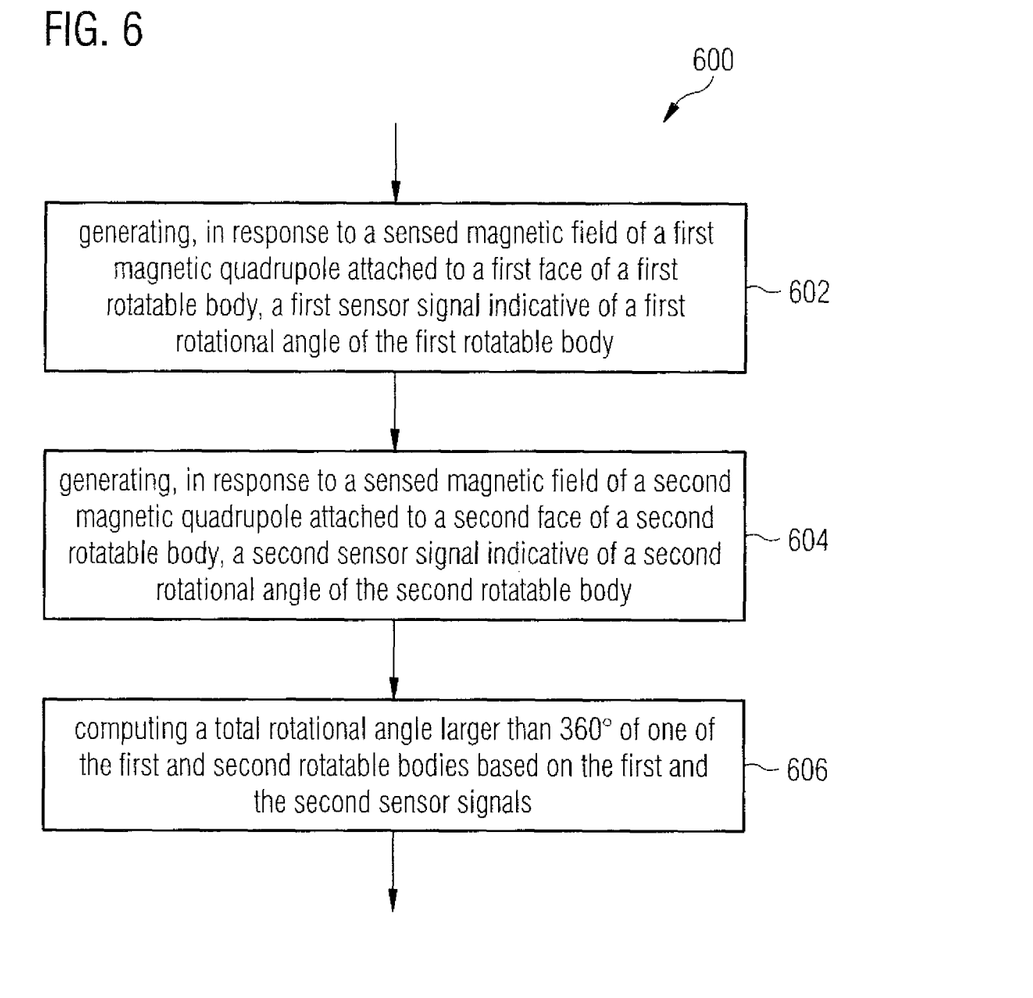
FIG. 6 illustrates a flowchart of a magnetic sensing method according to an example.

The skilled person having benefit from the present disclosure will appreciate that the sensor setups 400 and 500 can perform a corresponding method. A schematic flowchart of the method 600 is depicted in FIG. 6.

Method 600 includes generating 602, in response to a sensed magnetic field of a first magnetic quadrupole 106-1 attached to a first surface 104-1 of a first rotatable body 102-1, a first sensor signal indicative of a first rotational angle $\alpha_1$ of the first rotatable body, generating 604, in response to a sensed magnetic field of a second magnetic quadrupole 106-2 attached to a second surface of a second rotatable body 102-2, a second sensor signal indicative of a second rotational angle $\alpha_2$ of the second rotatable body, and computing 606 a total rotational angle $\varphi$ larger than 360° of one of the first and second rotatable bodies based on the first and the second sensor signals.

The proposed use of magnetic quadrupoles or quadrupole magnets allows for reduced crosstalk between respective magnetic fields. Thus, the first magnetic sensor may experience less interference from the second magnetic quadrupole and likewise the second magnetic sensor may experience less interference from the first magnetic quadrupole.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A magnetic sensor arrangement, comprising:
   a first rotatable body, implemented as a shaft with a circumferentially extending first tooth wheel, comprising:
      a first magnetic quadrupole combined with a first magnetic dipole portion, magnetic poles of the first magnetic dipole portion being separated in a direction perpendicular to a first rotational axis of the first rotatable body,
      the first magnetic quadrupole being directly mounted on an outer face surface of the first tooth wheel, and
      the first tooth wheel being arranged between the shaft and the first magnetic quadrupole;
   a first magnetic sensor configured to generate, in response to a rotational angular position of the first magnetic quadrupole, a first sensor signal indicative of a first rotational angle of the first rotatable body;
   a second rotatable body, implemented with circumferentially extending second tooth wheel, comprising:
      a second magnetic quadrupole combined with a second magnetic dipole portion,
      magnetic poles of the second magnetic dipole portion being separated in a direction perpendicular to a second rotational axis of the second rotatable body, and
      the second magnetic quadrupole being directly mounted on an outer face surface of the second tooth wheel; and
   a second magnetic sensor configured to generate, in response to a rotational angular position of the second magnetic quadrupole, a second sensor signal indicative of a second rotational angle of the second rotatable body.

2. The magnetic sensor arrangement of claim 1, wherein the first rotational axis of the first rotatable body is parallel to the second rotational axis of the second rotatable body.

3. The magnetic sensor arrangement of claim 1, wherein the first magnetic sensor is positioned relative to the first magnetic quadrupole along the first rotational axis of the first rotatable body, and
   wherein the second magnetic sensor is positioned relative to the second magnetic quadrupole along the second rotational axis of the second rotatable body.

4. The magnetic sensor arrangement of claim 1, wherein a sensing surface of the first magnetic sensor faces the first magnetic quadrupole, and wherein a sensing surface of the second magnetic sensor faces the second magnetic quadrupole.

5. The magnetic sensor arrangement of claim 1, wherein a distance between the first magnetic quadrupole and the second magnetic quadrupole is less than 30 mm.

6. The magnetic sensor arrangement of claim 1, wherein the first magnetic quadrupole comprises a third magnetic dipole portion and an adjacent and oppositely oriented fourth magnetic dipole portion, wherein respective magnetic poles of the third magnetic dipole portion and the fourth magnetic dipole portion are separated in a direction parallel to the first rotational axis the first rotatable body.

7. The magnetic sensor arrangement of claim 1, wherein the first magnetic quadrupole and the second magnetic quadrupole are configured to generate respective magnetic fields of equal strength.

8. The magnetic sensor arrangement of claim 1, wherein the first magnetic quadrupole is arranged in a first soft-magnetic shield and wherein the second magnetic quadrupole is arranged in a second soft-magnetic shield.

9. The magnetic sensor arrangement of claim 8, wherein a bottom of a respective soft-magnetic shielding sleeve is attached to a respective surface of a respective rotatable body of the first rotatable body and the second rotatable body, and wherein a top opening of the respective soft-magnetic shielding sleeve faces a respective magnetic sensor of the first magnetic sensor and the second magnetic sensor.

10. The magnetic sensor arrangement of claim 1, wherein the first rotatable body and the second rotatable body are rotationally symmetric bodies, respectively.

11. The magnetic sensor arrangement of claim 1, wherein the first rotatable body is rotatably coupled to the second rotatable body.

12. The magnetic sensor arrangement of claim 1, wherein the first rotatable body is rotatably coupled to the second rotatable body via the first tooth wheel and the second tooth wheel.

13. The magnetic sensor arrangement of claim 1, wherein the first tooth wheel has a first quantity of teeth and the second tooth wheel has a second quantity of teeth, the first quantity being different from the second quantity.

14. The magnetic sensor arrangement of claim 1, wherein the second rotatable body is a shaft or a gear wheel.

15. The magnetic sensor arrangement of claim 1, further comprising:

a processor configured to compute, based on the first sensor signal and the second sensor signal, a total rotational angle larger than 360° of one of:
the first rotatable body,
the second rotatable body, or
a third rotatable body engaging with the first rotatable body and/or the second rotatable body.

16. A magnetic sensor arrangement, comprising:
a rotatably mounted shaft comprising:
a first tooth wheel comprising a first outer face;
a first magnetic quadrupole directly attached to the first outer face,
wherein the first magnetic quadrupole is combined with a first magnetic dipole portion, and wherein magnetic poles of the first magnetic dipole portion are separated in a direction perpendicular to a first rotational axis of the rotatably mounted shaft, and wherein the first tooth wheel is arranged between the rotatably mounted shaft and the first magnetic quadrupole;

a first magnetic sensor configured to generate, based on a magnetic field of the first magnetic quadrupole, a first sensor signal indicative of a first rotational angle of the rotatably mounted shaft;

a rotatably mounted object, rotatably coupled to the rotatably mounted shaft, comprising:
a second tooth wheel comprising a second outer face
a second magnetic quadrupole directly attached to the second outer face,
wherein the second magnetic quadrupole is combined with a second magnetic dipole portion,
wherein magnetic poles of the second magnetic dipole portion are separated in a direction perpendicular to a second rotational axis of the rotatably mounted object, and
wherein a distance between the first outer face and the second outer face is less than 30 mm;

a soft-magnetic or ferrous shield,
wherein the second tooth wheel is arranged between the second magnetic quadrupole and the soft-magnetic or ferrous shield;

a second magnetic sensor configured to generate, based on a magnetic field of the second magnetic quadrupole, a second sensor signal indicative of a second rotational angle of the rotatably mounted object; and a processor configured to compute a total rotational angle of the rotatably mounted shaft larger than 360° based on the first sensor signal and the second sensor signal.

17. The magnetic sensor arrangement of claim 16, wherein the first magnetic quadrupole comprises a third magnetic dipole portion and an adjacent and oppositely oriented fourth magnetic dipole portion, wherein magnetic poles of the third magnetic dipole portion and the fourth magnetic dipole portion are separated in a direction parallel to the first rotational axis of the rotatably mounted shaft, wherein the second magnetic quadrupole comprises a fifth magnetic dipole portion and an adjacent and oppositely oriented sixth magnetic dipole portion, and wherein magnetic poles of the fifth magnetic dipole portion and the sixth magnetic dipole portion are separated in a direction parallel to the second rotational axis of the rotatably mounted object.

18. The magnetic sensor arrangement of claim 16, wherein a sensing surface of the first magnetic sensor faces a top surface of the first magnetic quadrupole, and wherein a sensing surface of the second magnetic sensor faces a top surface of the second magnetic quadrupole.

19. The magnetic sensor arrangement of claim 16, wherein the rotatably mounted shaft and the rotatably mounted object are rotatable in a same direction or in different directions.

20. A magnetic sensing method, comprising:
generating, based on a sensed magnetic field of a first magnetic quadrupole attached to a first rotatable body implemented with a circumferentially extending first tooth wheel, a first sensor signal indicative of a first rotational angle of the first rotatable body, wherein the first magnetic quadrupole is directly mounted on an outer face surface of the first tooth wheel, wherein the first tooth wheel is arranged between the first rotatable body and the first magnetic quadrupole, wherein the first magnetic quadrupole is combined with a first magnetic dipole portion, and wherein magnetic poles of the first magnetic dipole portion are separated in a direction perpendicular to a first rotational axis of the first rotatable body;

generating, based on a sensed magnetic field of a second magnetic quadrupole attached to a second rotatable body implemented with circumferentially extending second tooth wheel, a second sensor signal indicative of a second rotational angle of the second rotatable body, wherein the second magnetic quadrupole is directly mounted on an outer face surface of the second tooth wheel, wherein the second magnetic quadrupole is combined with a second magnetic dipole portion, and wherein magnetic poles of the second magnetic dipole portion are separated in a direction perpendicular to a second rotational axis of the second rotatable body; and computing a total rotational angle larger than 360° of one of:

the first rotatable body, the second rotatable body, or a third rotatable body engaging with the first rotatable body and/or the second rotatable body based on the first sensor signal and the second sensor signal.

* * * * *

UNITED STATES PATENT AND TRADEMARK OFFICE
CERTIFICATE OF CORRECTION

PATENT NO. : 10,928,221 B2
APPLICATION NO. : 15/899446
DATED : February 23, 2021
INVENTOR(S) : Udo Ausserlechner It is certified that error appears in the above-identified patent and that said Letters Patent is hereby corrected as shown below:

In the Claims

Claim 16:
Column 13, Line 67, change "a first magnetic dipole portion, and" to --a first magnetic dipole portion,--

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*